(12) United States Patent
Zhang et al.

(10) Patent No.: US 11,277,258 B1
(45) Date of Patent: Mar. 15, 2022

(54) PRIVACY PROTECTION-BASED USER RECOGNITION METHODS, APPARATUSES, AND DEVICES

(71) Applicant: ALIPAY (HANGZHOU) INFORMATION TECHNOLOGY CO., LTD., Zhejiang (CN)

(72) Inventors: Juntao Zhang, Hangzhou (CN); Qixian Zhou, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/359,456

(22) Filed: Jun. 25, 2021

(30) Foreign Application Priority Data

Sep. 11, 2020 (CN) .......................... 202010952277.X

(51) Int. Cl.
*G06F 7/04* (2006.01)
*H04L 9/00* (2022.01)
(Continued)

(52) U.S. Cl.
CPC .......... *H04L 9/008* (2013.01); *G06F 21/6245* (2013.01); *G06K 9/00228* (2013.01);
(Continued)

(58) Field of Classification Search
CPC ... H04L 9/008; H04L 9/3231; H04L 63/0861; G06K 9/00228; G06K 9/00281;
(Continued)

(56) References Cited

U.S. PATENT DOCUMENTS 8,316,237 B1 * 11/2012 Felsher .................. H04L 9/0825
713/171
10,020,933 B2 * 7/2018 Yasuda .................... H04L 9/008
(Continued)

FOREIGN PATENT DOCUMENTS

CN      103491238 A   *   1/2014
CN      105187217 A   *   12/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Mahendra R Patel
(74) *Attorney, Agent, or Firm* — Fish & Richardson P.C.

(57) ABSTRACT

Disclosed herein are methods, systems, and media for privacy-protected user recognition. One of the methods comprising obtaining a biometric feature of a first user; performing homomorphic encryption on the biometric feature of the first user to obtain a first ciphertext feature; determining a candidate ciphertext feature from a predetermined ciphertext feature set based on the first ciphertext feature and a predetermined graph structure index, wherein the predetermined ciphertext feature set comprises a plurality of second ciphertext features obtained by performing the homomorphic encryption of a plurality of second biometric features of multiple second users, and wherein the predetermined graph structure index is generated based on similarity among at least some of the plurality of second ciphertext features in the predetermined ciphertext feature set; and determining a recognition result for the first user based on the candidate ciphertext feature.

14 Claims, 5 Drawing Sheets

(51) Int. Cl.
*G06F 21/62* (2013.01)
*G06K 9/00* (2022.01)
*G06Q 20/40* (2012.01)
*G06F 21/32* (2013.01)
*G06N 3/04* (2006.01)

(52) U.S. Cl.
CPC .......... *G06K 9/00281* (2013.01); *G06F 21/32* (2013.01); *G06N 3/04* (2013.01); *G06Q 20/40145* (2013.01)

(58) Field of Classification Search
CPC .. G06F 21/6245; G06F 21/32; G06F 21/6254; G06Q 20/40145; G06N 3/04
USPC .......................................................... 726/26
See application file for complete search history.

(56) References Cited

U.S. PATENT DOCUMENTS

| | | | | |
|---|---|---|---|---|
| 11,005,661 | B1* | 5/2021 | Neumann | H04L 9/3297 |
| 2011/0302640 | A1* | 12/2011 | Liu | H04W 12/06 |
| | | | | 726/6 |
| 2013/0035979 | A1* | 2/2013 | Tenbrock | G06Q 30/02 |
| | | | | 705/7.29 |
| 2016/0063235 | A1 | 3/2016 | Tussy | |
| 2017/0104752 | A1* | 4/2017 | Sakemi | H04L 9/008 |
| 2019/0182216 | A1* | 6/2019 | Gulak | G16H 10/60 |
| 2019/0332758 | A1* | 10/2019 | Yin | G06T 11/00 |
| 2019/0332807 | A1* | 10/2019 | LaFever | H04L 63/0407 |
| 2020/0143066 | A1* | 5/2020 | Klontz | G06F 21/606 |
| 2020/0218794 | A1* | 7/2020 | Zheng | G06F 21/32 |
| 2020/0228336 | A1* | 7/2020 | Streit | H04L 9/3231 |
| 2021/0211290 | A1* | 7/2021 | Jindal | H04L 9/3263 |
| 2021/0211292 | A1* | 7/2021 | Kim | G06F 21/32 |

FOREIGN PATENT DOCUMENTS

| | | | | | |
|---|---|---|---|---|---|
| CN | 105354273 | A | * | 2/2016 | |
| CN | 105354273 | A | | 2/2016 | |
| CN | 105635099 | | | 6/2016 | |
| CN | 107919965 | | | 4/2018 | |
| CN | 110134804 | A | * | 8/2019 | |
| CN | 110134804 | A | | 8/2019 | |
| CN | 110245573 | A | * | 9/2019 | |
| CN | 110728196 | A | * | 1/2020 | |
| CN | 111181712 | A | | 5/2020 | |
| KR | 101755995 | | | 7/2017 | |
| KR | 101755995 | B1 | * | 7/2017 | |
| WO | WO-2021030634 | A1 | * | 2/2021 | G06K 9/00906 |
| WO | WO-2021049681 | A | * | 3/2021 | H04L 9/08 |

OTHER PUBLICATIONS

Nakamoto, "Bitcoin: A Peer-to-Peer Electronic Cash System," www.bitcoin.org, 2005, 9 pages.
Extended European Search Report in European Application No. 21181944.6, dated Dec. 2, 2021, 10 pages.
He et al., "Privacy-Aware Offloading in Mobile-Edge Computing," 2017 IEEE Global Communications Conference, Dec. 4, 2017, pp. 1-6.

* cited by examiner

PRIVACY PROTECTION-BASED USER RECOGNITION METHODS, APPARATUSES, AND DEVICES

CROSS-REFERENCE TO RELATED APPLICATIONS

This application claims priority to Chinese Patent Application No. 202010952277.X, filed on Sep. 11, 2020, which is hereby incorporated by reference in its entirety.

TECHNICAL FIELD

The present specification relates to the field of computer software technologies, and in particular, to privacy protection-based user recognition methods, apparatuses, and devices.

BACKGROUND

The rapid development of Internet technologies has also promoted the development of rich and diversified payment methods. Face scanning payment is a payment method that has emerged and gradually popularized in recent years, and is widely used in shopping malls, supermarkets, self-service vending machines, etc.

In the existing technology, face scanning payment needs real-time support from a cloud side, and important processes such as facial features comparison are performed in the cloud side. Therefore, good network support is needed. With the popularity of face scanning payment, there is also a practical need to deploy face scanning payment in a subway, bus, group meal, etc. In these scenarios, networks are often offline or network signals are often weak. To prevent such situations from adversely affecting user experience for face scanning payment, a face scanning payment process can be considered to be delivered from the cloud side to a terminal device, and then correspondingly a pre-registered facial feature library used to recognize users is also delivered to the terminal device. It is possible to achieve reverse user portrait based on facial features and achieve a high degree of similarity.

Based on the previous description, a user recognition solution applicable to a terminal device and able to protect privacy such as facial features is needed, to better support services such as face scanning payment.

SUMMARY

One or more embodiments of the present specification provide privacy protection-based user recognition methods, apparatuses, and devices, and storage media, to resolve the following technical problem: a user recognition solution applicable to a terminal device and able to protect privacy such as facial features is needed.

To resolve the technical problem, the one or more embodiments of the present specification are implemented as follows:

One or more embodiments of the present specification provide a privacy protection-based user recognition method, including the following: a biometric feature of a first user is obtained; homomorphic encryption is performed on the biometric feature of the first user to obtain a first ciphertext feature; a candidate ciphertext feature is determined from a predetermined ciphertext feature set based on the first ciphertext feature and a predetermined graph structure index, where the ciphertext feature set includes second ciphertext features obtained by performing homomorphic encryption on biometric features of multiple second users, and the graph structure index is generated based on similarity among ciphertext features obtained through homomorphic encryption; and a recognition result for the first user is determined based on the candidate ciphertext feature.

One or more embodiments of the present specification provide a privacy protection-based user recognition apparatus, including: a feature acquisition module, configured to obtain a biometric feature of a first user; a homomorphic encryption module, configured to perform homomorphic encryption on the biometric feature of the first user to obtain a first ciphertext feature; a graph structure index module, configured to determine a candidate ciphertext feature from a predetermined ciphertext feature set based on the first ciphertext feature and a predetermined graph structure index, where the ciphertext feature set includes second ciphertext features obtained by performing homomorphic encryption on biometric features of multiple second users, and the graph structure index is generated based on similarity among ciphertext features obtained through homomorphic encryption; and a recognition determining module, configured to determine a recognition result for the first user based on the candidate ciphertext feature.

One or more embodiments of the present specification provide a privacy protection-based user recognition device, including: at least one processor; and a memory communicably coupled to the at least one processor, where the memory stores instructions that can be executed by the at least one processor, and the instructions are executed by the at least one processor to enable the at least one processor to: obtain a biometric feature of a first user; perform homomorphic encryption on the biometric feature of the first user to obtain a first ciphertext feature; determine a candidate ciphertext feature from a predetermined ciphertext feature set based on the first ciphertext feature and a predetermined graph structure index, where the ciphertext feature set includes second ciphertext features obtained by performing homomorphic encryption on biometric features of multiple second users, and the graph structure index is generated based on similarity among ciphertext features obtained through homomorphic encryption; and determine a recognition result for the first user based on the candidate ciphertext feature.

One or more embodiments of the present specification provide a non-volatile computer storage medium, storing computer-executable instructions. The computer-executable instructions are set to: obtain a biometric feature of a first user; perform homomorphic encryption on the biometric feature of the first user to obtain a first ciphertext feature; determine a candidate ciphertext feature from a predetermined ciphertext feature set based on the first ciphertext feature and a predetermined graph structure index, where the ciphertext feature set includes second ciphertext features obtained by performing homomorphic encryption on biometric features of multiple second users, and the graph structure index is generated based on similarity among ciphertext features obtained through homomorphic encryption; and determine a recognition result for the first user based on the candidate ciphertext feature.

The at least one technical solution used in the one or more embodiments of the present specification can achieve the following beneficial effects: the privacy of the second users can be effectively protected through homomorphic encryption, and homomorphic encryption can be normally applied to a terminal device for features comparison to recognize whether the first user is a certain one of the second users.

BRIEF DESCRIPTION OF DRAWINGS

To describe technical solutions in the embodiments of the present specification or in the existing technology more clearly, the following briefly describes the accompanying drawings needed for describing the embodiments or the existing technology. Clearly, the accompanying drawings in the following descriptions show merely some embodiments of the present specification, and a person of ordinary skill in the art can still derive other drawings from these accompanying drawings without creative efforts.

DESCRIPTION OF EMBODIMENTS

Embodiments of the present specification provide privacy protection-based user recognition methods, apparatuses, and devices, and storage media.

To make a person skilled in the art better understand the technical solutions in the present specification, the following clearly and comprehensively describes the technical solutions in the embodiments of the present specification with reference to the accompanying drawings in the embodiments of the present specification. Clearly, the described embodiments are merely some rather than all of the embodiments of the present application. All other embodiments obtained by a person of ordinary skill in the art based on the embodiments of the present specification without creative efforts shall fall within the protection scope of the present application.

In the one or more embodiments of the present specification, the provided solutions support a terminal device in an offline environment or a weak network environment. A cloud side can perform homomorphic encryption the privacy of multiple second users and then send encrypted privacy to the terminal device to recognize whether a first user is certain one of the second users, so that the privacy of the second users can be effectively protected, and ciphertext data comparison can effectively reflect similarity among corresponding plaintext data, thereby ensuring accuracy of a recognition result. In addition, the use of a graph structure index helps improve efficiency of determining a candidate ciphertext feature, thereby helping improve user recognition efficiency and supporting serving more users. The cloud side here can be specifically a corresponding application relative to the terminal device, a device on a server side of the corresponding application, or a remote third-party device. The corresponding application is, for example, a face scanning payment application, a fingerprint payment application, or other applications having a biometric feature authentication function. The following provides detailed descriptions based on this idea.

Figure 1:
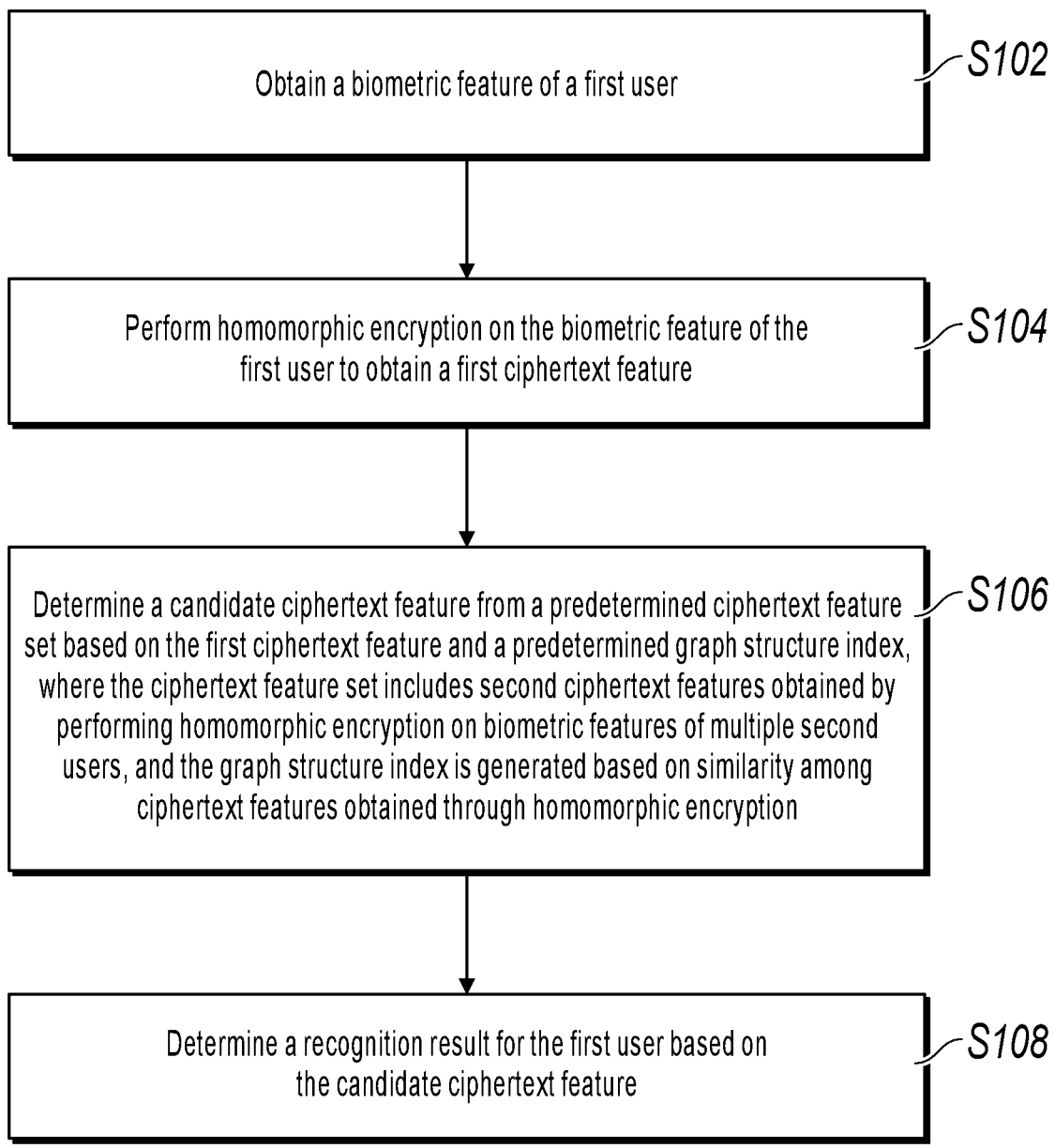
FIG. 1 is a schematic flowchart illustrating a privacy protection-based user recognition method, according to one or more embodiments of the present specification.

FIG. 1 is a schematic flowchart illustrating a privacy protection-based user recognition method, according to one or more embodiments of the present specification. The method can be performed by a terminal device, which is referred to terminal-side execution. For example, for the application scenario in the background, the method is applicable to a terminal device even in an offline environment or a weak network environment and can achieve a better recognition effect and relatively high recognition efficiency.

Figure 2:
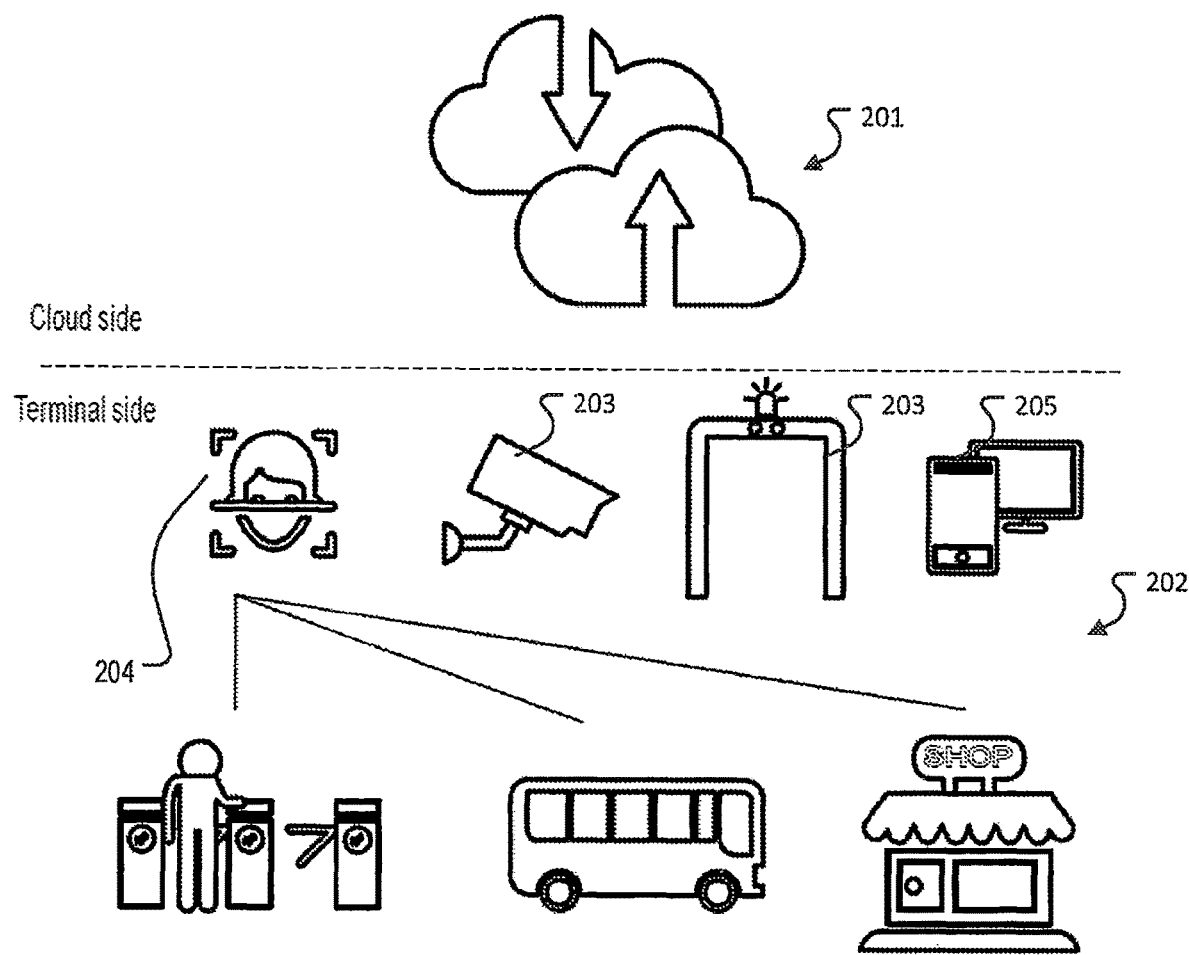
FIG. 2 is a schematic diagram illustrating an application scenario of the method in FIG. 1, according to one or more embodiments of the present specification.

The terminal device (202 in FIG. 2) is, for example, a user mobile terminal device, e.g., 205 in FIG. 2, and/or a public terminal device, e.g., 203 in FIG. 2. Common user mobile terminal devices include a smartphone, a tablet computer, a handheld device, etc. Common public terminal devices include security inspection equipment, a turnstile, a surveillance camera, and a cashiering device in a bus, subway, a shopping mall, etc.

A first user and second users are mentioned in the process. The first user is a current user to be recognized, and the second users are users having pre-registered biometric features. Whether the first user is a certain one of the second users is determined through recognition.

The process shown in FIG. 1 can include the following steps.

S102. Obtain a biometric feature of a first user.

In the one or more embodiments of the present specification, for face recognition-based face scanning payment, the biometric feature is a facial feature. In addition, the biometric feature can be a fingerprint, palmprint, iris, sclera, voiceprint, heartbeat, pulse, genetic material, human tooth bite mark, gait, etc.

In the one or more embodiments of the present specification, the biometric feature of the first user is obtained through on-site collection, which needs to be supported by a sensing device corresponding to the biometric feature.

For example, in a subway station, if the turnstile supports face recognition, the facial features are collected by using a component such as a camera of the turnstile when the first user passes the turnstile. A specific method for obtaining the facial features includes the following: a data collection operation is performed on the face of the first user by using an optical component of the user mobile terminal device or the public terminal device, and the facial features of the first user are extracted based on the data collection operation. For example, a face image (which can be an ordinary face photo) is collected by using the camera of the turnstile, the face image is input to a pre-trained neural network model for processing, and the facial features are extracted by using a hidden layer of the neural network model.

In actual applications, to accurately obtain the facial feature, support from more optical components may be further needed. The collected image may further include a projected dot-matrix image, etc. that reflects depth-of-field information. For example, the facial features are obtained based on structured light, and the optical component can include an infrared camera, a flood light sensor, a dot-matrix projector, etc.

S104. Perform homomorphic encryption on the biometric feature of the first user to obtain a first ciphertext feature.

In the one or more embodiments of the present specification, the biometric feature is the privacy of the user, and the biometric feature is protected through homomorphic encryption to prevent the privacy of the user from being disclosed. An advantage of using homomorphic encryption here further lies in the following: if similarity comparison is performed between biometric features obtained through homomorphic encryption, an obtained comparison result can also effectively reflect similarity among corresponding plaintexts. As such, the privacy can be protected while the user can be recognized based on a ciphertext.

However, if other encryption methods are used, comparison between corresponding ciphertexts may be meaningful only when plaintexts are exactly the same. However, in most biometric feature recognition scenarios, even for the same user, a biometric feature registered by the user may be slightly or greatly different from a biometric feature collected during subsequent recognition based on collection conditions. Therefore, the two biometric features are usually merely highly similar, but difficult to be exactly the same. Based on this, if other encryption methods are used, it is difficult to achieve the beneficial effect mentioned in the above paragraph.

S106. Determine a candidate ciphertext feature from a predetermined ciphertext feature set based on the first ciphertext feature and a predetermined graph structure index, where the ciphertext feature set includes second ciphertext features obtained by performing homomorphic encryption on biometric features of multiple second users, and the graph structure index is generated based on similarity among ciphertext features obtained through homomorphic encryption.

In the one or more embodiments of the present specification, for example, the execution body is the terminal device. The graph structure index and the ciphertext feature set can be pre-delivered to the terminal device through online transmission or offline duplication. Then, the terminal device still can perform the user recognition process based on the pre-delivered data even if the terminal device does not have a good network condition. Homomorphic encryption is performed on the biometric features and then encrypted biometric features are delivered, so that the privacy of the second users can be protected.

In the one or more embodiments of the present specification, because the ciphertext feature set includes the second ciphertext features respectively corresponding to the multiple second users, the multiple different second users can be successfully recognized. This capability is very applicable to public crowd recognition in a public place. Certainly, this capability is conveniently applicable to recognizing a user by using a personal mobile terminal device of the user.

Further, the ciphertext feature set can include a large quantity or even a massive quantity (for example, tens of millions) of second ciphertext features of second users, thereby helping improve a capability of recognizing a large-traffic public crowd. In this case, recognition efficiency becomes more important. Here, the recognition efficiency is effectively improved by using the graph structure index. The graph structure index is generated based on at least some ciphertext features in the ciphertext feature set, and is used to quickly determine a ciphertext feature that has a relatively high similarity degree with the first ciphertext feature from the at least some ciphertext features as the candidate ciphertext feature.

In the one or more embodiments of the present specification, the graph structure index can be generated based on a neighbor search algorithm, for example, the hierarchical navigable small world (HNSW) algorithm, the navigable small world (NSW) algorithm, the K-dimensional (KD) tree, etc. The graph structure index may already include needed ciphertext features. In this case, when the graph structure index is delivered, the ciphertext features do not need to be delivered again, thereby reducing data transmission and storage costs.

For the graph structure index, as graph nodes, the ciphertext feature can be represented by using vectors. A degree of similarity between the ciphertext features can be measured based on the distance (such as Euclidean distance) between the graph nodes or a cosine value of the angle between the corresponding vectors.

In the one or more embodiments of the present specification, a reasonable similarity degree threshold can be set to help determine the candidate ciphertext feature. If a relatively high similarity degree threshold is set, a candidate ciphertext feature that satisfies the requirement may not be determined. This means that it is very likely that the first user is not any one of the second users. In this case, to improve recognition efficiency, it can be considered that it is directly determined that the first user cannot be successfully recognized as a recognition result, thereby helping start a recognition process for another user as soon as possible.

S108. Determine a recognition result for the first user based on the candidate ciphertext feature.

In the one or more embodiments of the present specification, there can be one or more candidate ciphertext features. Each candidate ciphertext feature corresponds to a second user. Based on the candidate ciphertext feature, whether a degree of similarity between the corresponding second user and the first user satisfies a predetermined condition (for example, is greater than a predetermined similarity degree threshold) is determined. If yes, it can be determined that the first user is the second user.

According to the method in FIG. 1, the privacy of the second users can be effectively protected through homomorphic encryption, and homomorphic encryption can be normally applied to a terminal device for features comparison to recognize whether the first user is a certain one of the second users.

Based on the method in FIG. 1, the present application further provides some specific implementation solutions and extended solutions of the method, which are continuously described below.

In the one or more embodiments of the present specification, with the development of sensing technologies and big data technologies, in actual applications, a vector of more dimensions is often used to accurately represent a biometric feature. The increase in dimension causes an increase in processing burden, which is not conducive to improving recognition efficiency. Based on this, dimension reduction processing can be performed on the biometric feature and then a biometric feature obtained after the dimension reduction processing is used for a recognition process. However, the dimension reduction processing can cause a reduction in accuracy of the biometric feature. In consideration of accuracy, the biometric feature obtained before the dimension reduction and the biometric feature obtained after the dimension reduction can both be used in the recognition process, thereby achieving a better balance between accuracy and efficiency.

Some of the following embodiments are described based on this idea. For ease of description, the following uses two concepts "high-dimensional" and "low-dimensional" to distinguish between dimensions respectively corresponding to a feature obtained before dimension reduction and a feature obtained after the dimension reduction. It is worthwhile to note that high/low here is relative, and a specific range of high/low can be defined based on actual conditions such as different biometric features and different solution implementation capabilities.

Facial features are used as an example. If an original collected facial feature is 512-dimensional, it can be considered that 512-dimensional belongs to high-dimensional; and if the 512-dimensional facial feature is reduced to a 64-dimensional or 32-dimensional facial feature through dimension reduction processing, it can be considered that 64-dimensional and 32-dimensional belong to low-dimensional. Similarly, if an original collected facial feature is 64-dimensional, and the 64-dimensional facial feature is reduced to a 32-dimensional facial feature through dimension reduction processing, it can be considered that 64-dimensional belongs to high-dimensional and 32-dimensional belongs to low-dimensional.

In the one or more embodiments of the present specification, generally, homomorphic encryption is performed on both a high-dimensional feature and a corresponding low-dimensional feature to respectively obtain a high-dimensional ciphertext and a low-dimensional ciphertext; and a low-dimensional similar feature is quickly indexed by using the low-dimensional ciphertext, a high-dimensional similar feature corresponding to the low-dimensional similar feature is determined, and the high-dimensional ciphertext is compared with the high-dimensional similar feature to determine a recognition result. Based on this idea, efficiency is improved through low-dimensional indexing, accuracy is improved through high-dimensional comparison, so that both the efficiency and the accuracy are considered, thereby helping achieve a better effect as a whole. The following provides detailed descriptions based on this idea.

The ciphertext feature set is pre-generated, and the step is performed on, for example, a cloud side. Specifically, for the second user, a biometric feature of the second user is obtained, and homomorphic encryption is performed on the biometric feature of the second user to obtain a second ciphertext high-dimensional feature; and dimension reduction processing is performed on the biometric feature of the second user and then homomorphic encryption is performed to obtain a second ciphertext low-dimensional feature. The multiple second users can be separately processed in a similar way to obtain respective second ciphertext high-dimensional features and second ciphertext low-dimensional features of the second users. These second ciphertext high-dimensional features constitute a ciphertext high-dimensional feature subset, these second ciphertext low-dimensional features constitute a ciphertext low-dimensional feature subset, and the ciphertext high-dimensional feature subset and the ciphertext low-dimensional feature subset constitute the previously described predetermined ciphertext feature set.

The graph structure index is pre-generated, and the step is performed on, for example, a cloud side. Specifically, the graph structure index is generated based on the ciphertext low-dimensional feature subset. In this case, the candidate ciphertext feature is determined from the ciphertext low-dimensional feature subset. Assume that the graph structure index is generated based on the HNSW algorithm. Specifically, a second ciphertext low-dimensional feature corresponding to each second user in the ciphertext low-dimensional feature subset is separately used as one graph node, and each graph node is added based on a node adding method of the HNSW algorithm (a proper edge is created based on a corresponding policy in the adding process), to generate the graph structure index.

The execution body of the recognition method pre-obtains the ciphertext high-dimensional feature subset and the graph structure index. For example, the terminal device serves as the execution body to pre-receive needed data, such as the ciphertext high-dimensional feature subset and the graph structure index, generated and delivered by the cloud side. The cloud side is considered to be on a side opposite to a side of the execution body, and subsequent steps are also performed by a device on the side that the execution body is located on.

The process of recognizing the first user is started to first obtain the biometric feature of the first user, and perform homomorphic encryption on the biometric feature of the first user to obtain the first ciphertext feature. Specifically, homomorphic encryption is performed on the biometric feature of the first user to obtain a first ciphertext high-dimensional feature; and dimension reduction processing is performed on the biometric feature of the first user and then homomorphic encryption is performed to obtain a first ciphertext low-dimensional feature.

Processing parameters used for processing, such as dimension reduction and homomorphic encryption, performed on related data of the second user and the first user can be associated with each other or even the same, to reduce interference factors, so that a result of subsequent similarity comparison can be more accurate and reliable.

For example, assume that the second ciphertext feature is generated by the cloud side by performing homomorphic encryption with key A as an encryption key, key A sent by the cloud side can be pre-received, and homomorphic encryption is also performed on the biometric feature of the first user by using key A to obtain the first ciphertext feature. Similarly, assume that the second ciphertext high-dimensional feature and the second ciphertext low-dimensional feature are generated by performing homomorphic encryption by respectively using key a and key b, the first ciphertext high-dimensional feature and the first ciphertext low-dimensional feature can be correspondingly generated by performing homomorphic encryption by respectively using key a and key b.

The candidate ciphertext feature is determined. Assume that the graph structure index includes graph nodes representing at least some ciphertext features in the ciphertext feature set and an edge generated between the graph nodes for index query, one or more ciphertext features close to the first ciphertext feature can be specifically determined from the graph structure index through index query as the candidate ciphertext feature. The advantage of low-dimensional related processing in terms of improving efficiency has been previously described. Based on the description, if the at least some ciphertext features are, for example, the ciphertext low-dimensional feature subset, the candidate ciphertext feature is determined from the ciphertext low-dimensional feature subset through index query based on the first ciphertext low-dimensional feature and the predetermined graph structure index.

The recognition result for the first user is determined based on the candidate ciphertext feature. The candidate ciphertext feature already reflects a degree of similarity between the first user and the second user in a low-dimensional case. Therefore, if a degree of similarity between a certain candidate ciphertext feature and the first ciphertext low-dimensional feature (low-dimensional comparison) is high enough, it can be determined that the first user is a second user corresponding to the candidate ciphertext feature. Certainly, to obtain a more accurate and reliable recognition result, comparison can be performed in a high-dimensional case. Specifically, ciphertext features corresponding to the candidate ciphertext feature are determined form the ciphertext high-dimensional feature subset as comparison features, and the first ciphertext high-dimensional feature is compared with the comparison features (high-dimensional comparison) to determine the recognition result for the first user. For example, the first ciphertext high-dimensional feature is compared with the comparison features to determine whether there is a comparison feature that successfully matches the first ciphertext high-dimensional feature; and if yes, it is determined that the first user is a second user corresponding to the successfully matched high-dimensional feature for the recognition result of the first user.

In the one or more embodiments of the present specification, alternatively, a high-dimensional feature can be compared with a low-dimensional feature. For example, the second ciphertext high-dimensional features and the second ciphertext low-dimensional features are constructed in the same graph to improve comparability between the high-dimensional feature and the low-dimensional feature, and then the first ciphertext high-dimensional feature is compared with the second ciphertext low-dimensional feature or the first ciphertext low-dimensional feature is compared with the second ciphertext high-dimensional feature based on the corresponding graph structure index to obtain the recognition result for the first user.

Based on the previous descriptions, more intuitively, the one or more embodiments of the present specification further provide an application scenario of the method in FIG. 1 and a detailed process of the method in FIG. 1 in the application scenario, which are described with reference to FIG. 2 and FIG. 3.

FIG. 2 is a schematic diagram illustrating an application scenario of the method in FIG. 1, according to one or more embodiments of the present specification. This application scenario includes devices on two sides: a cloud side 201 and a terminal side 202. A biometric feature is specifically a facial feature 204, and the terminal side 202 specifically includes a public face collection terminal device 203 disposed in a place such as a subway, a bus, or a shopping mall. Multiple users pre-register respective facial features in a cloud side 201. The cloud side 201 performs privacy protection on the facial features registered by the users, and pre-delivers data that face recognition needs to be based on to the terminal side 202. The terminal side 202 performs face recognition on multiple users on-site based on the data delivered by the cloud side 201, to authenticate user identities and perform a service operation such as money deduction for an authenticated user.

Figure 3:
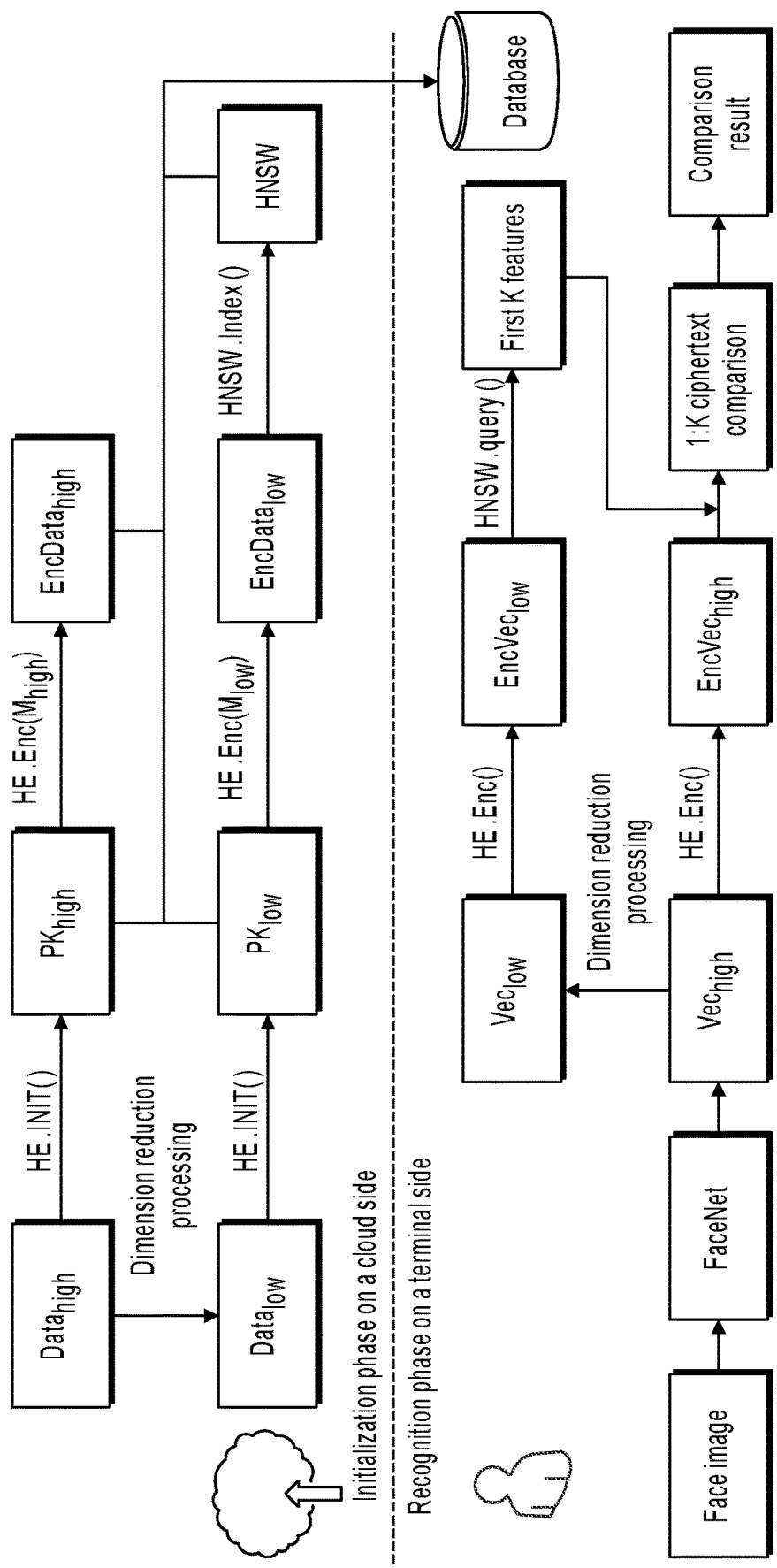
FIG. 3 is a detailed schematic flowchart illustrating the method in FIG. 1 in the application scenario in FIG. 2, according to one or more embodiments of the present specification.

FIG. 3 is a detailed schematic flowchart illustrating the method in FIG. 1 in the application scenario in FIG. 2, according to one or more embodiments of the present specification.

In this application scenario, a graph structure index is generated by using the HNSW algorithm for use, a degree of similarity between graph nodes is measured by using the Euclidean distance, and processing functions provided by the homomorphic encryption algorithm and the HNSW algorithm are used to improve processing efficiency.

Processing functions provided by the homomorphic encryption algorithm include the following:

HE.INIT( ) represents a key generation function, used to generate a public-private key pair (PK, SK) for homomorphic encryption, where PK represents a public key, and SK represents a private key.

HE.Enc(PK,x) represents an encryption function, used to perform homomorphic encryption on plaintext x by using PK as an encryption key, to obtain a corresponding ciphertext, denoted as c.

HE.Dec(SK,c) represents a decryption function, used to decrypt ciphertext c by using SK as a decryption key, to obtain corresponding plaintext x.

HE.EncDist ($c_1$, $c_2$) represents a ciphertext Euclidean distance calculation function, used to calculate the Euclidean distance between ciphertext $c_1$ and ciphertext $c_2$.

Assume that there is a data set: Data=$\{x_1, x_2, \ldots, x_n\}$, where $x_i$ is an m-dimensional feature vector.

Keys are generated by using the key generation function:

(PK,SK)=HE.INIT( ).

Homomorphic encryption is performed on the elements in Data by using the encryption function (for ease of description, some of the following steps are represented by using pseudocode):

for $x_i$ in Data, $c_i$=HE.Enc(PK, $x_i$), so that a corresponding ciphertext set is obtained:

EncData=$\{c_1, c_2, \ldots, c_n\}$.

A function provided by the HNSW algorithm and used to identify the closest ciphertext node is used:

HNSW.findNearestPoint($c_i$,EncData).

For a specified ciphertext node $c_i$, a ciphertext node closest to $c_i$ is identified from EncData, and is denoted as $c_j$. Details are as follows:

$dist_{i,j}$=HE.EncDist($c_i$,$c_j$),$c_j \in \{c_1,c_2, \ldots ,c_n\}$ is calculated sequentially to obtain a set:

Dist=$\{Dist_{i,1},Dist_{i,2}, \ldots ,Dist_{i,n}\}$.

After the elements in dist are sorted, the minimum value $mindist_{i,j}$ and corresponding ciphertext node $c_j$ are identified.

The HNSW algorithm further provides a function used to add a graph node:

HNSW.Add($c_i$).

Specifically, for node $c_i$ that has not been added to the graph, the number of layers for the current node, level, is calculated for example, by using an equation level=int(−$\log_2$(random( ))*self.level_mult)+1; and nodes ep closest to $c_i$ are sequentially identified starting from the highest layer of the current graph, where ep at the previous layer is used as input of the current layer, and ep can be calculated by using HNSW.findNearestPoint( ). By analogy, node ep closest to $c_i$ at the (level)th layer is identified. Then, $c_i$ is sequentially added to all layers of the graph from the (level−1)th layer to the 0th layer according to the following steps:

(1) At each layer, ef nodes closest to $c_1$ are identified by using HNSW.findNearestPoint( ) starting from ep, and ep is updated.

(2) After ep is identified, m nodes are identified from the of nodes by using a heuristic selection algorithm, and $c_i$ is connected to the m nodes.

(3) The m nodes are also connected to $c_i$.

(4) Then, ep is transmitted to next-layer search as input.

Steps (1) to (4) are repeated until node $c_i$ is added to the current graph at the 0th layer.

The HNSW algorithm further provides a function used to generate a graph structure index:

HNSW.index(EncData).

For specified node set EncData, specifically, the nodes in the specified node set are added to a graph to generate a graph structure index:

for $c_i$ in EncData

HNSW.Add($c_i$).

The HNSW algorithm further provides a function that is used to query a node function near a specified node:

HNSW.query($c_i,k$).

For specified node $c_i$, node elem closest to $c_i$ is identified from the highest layer L by using HNSW.findNearestPoint( ) and elem is used as a start point of the (L−1)th layer to start query, to identify node point closet to elem. The step is repeated until the 0th layer. At the 0th layer, k nodes closet to point are identified starting from current point and returned.

The process in FIG. 3 is described based on the previous descriptions of the functions and the processes. The process in FIG. 3 can include two phases: an initialization phase on a cloud side and a recognition phase on the terminal side.

The initialization phase on the cloud side can include the following steps:

Dimension reduction processing is performed on high-dimensional facial feature database $Data_{high}$ (the previously described biometric features of the multiple second users) to obtain low-dimensional facial feature database $Data_{low}$. Assume that the facial features are processed by using a neural network model, a specific dimension number of high dimension depends on the number of nodes at a corresponding hidden layer or output layer of the neural network model, a specific dimension number of low dimension is specifically set based on, for example, a specific scenario and a recall rate requirement, and a used dimension reduction processing algorithm can also be set based on the specific scenario.

$PK_{high}$ and $PK_{low}$ are generated by using HE.INIT ( ) and stored, and homomorphic encryption is performed on elements $M_{high}$ and $M_{low}$ in $Data_{high}$ and $Data_{low}$ based on $PK_{high}$ and $PK_{low}$ by using HE.Enc( ) to obtain $EncData_{high}$ (the previously described ciphertext high-dimensional feature subset) and $EncData_{low}$ (the previously described ciphertext low-dimensional feature subset).

HNSW (the previously described graph structure index) is generated based on $EncData_{low}$ by using HNSW.index( ).

$EncData_{high}$, EHNSW, $PK_{high}$ and $PK_{low}$ are delivered to the terminal side and stored in a database on the terminal side for use.

The recognition phase on the terminal side can include the following steps:

A terminal device collects a face image of a first user, and extracts facial features $Vec_{high}$ (the previously described biometric feature of the first user) from the face image by using pre-trained neural network model FaceNet. Facial features in $Data_{high}$ can also be extracted by using FaceNet, which achieves better consistency, thereby helping reduce interference factors.

Dimension reduction processing is performed on $Vec_{high}$ to obtain $Vec_{low}$, where a used dimension reduction processing algorithm can be consistent with the dimension reduction processing algorithm used on the cloud side.

Homomorphic encryption is performed on $Vec_{high}$ and $Vec_{low}$ based on $PK_{high}$ and $PK_{low}$ by using HE.Enc( ), to obtain $EncVec_{high}$ (the previously described first ciphertext high-dimensional feature) and $EncVec_{low}$ (the previously described first ciphertext low-dimensional feature).

The first K ciphertext features (the previously described candidate ciphertext feature) closest to $EncVec_{low}$ are determined from HNSW through index query by using HNSW.query( ).

$EncVec_{high}$ is compared with ciphertext features (the previously described comparison features) corresponding to the first K ciphertext features in $EncData_{high}$, or $EncVec_{high}$ is compared with the first K ciphertext features, to obtain a comparison result, thereby recognizing the first user.

Based on the same idea, biometric features of multiple second users can be combined and then homomorphic encryption can be performed, and a corresponding graph structure index can be generated, to support simultaneous recognition of multiple first users, thereby recognizing a large-traffic public crowd more efficiently.

Figure 4:
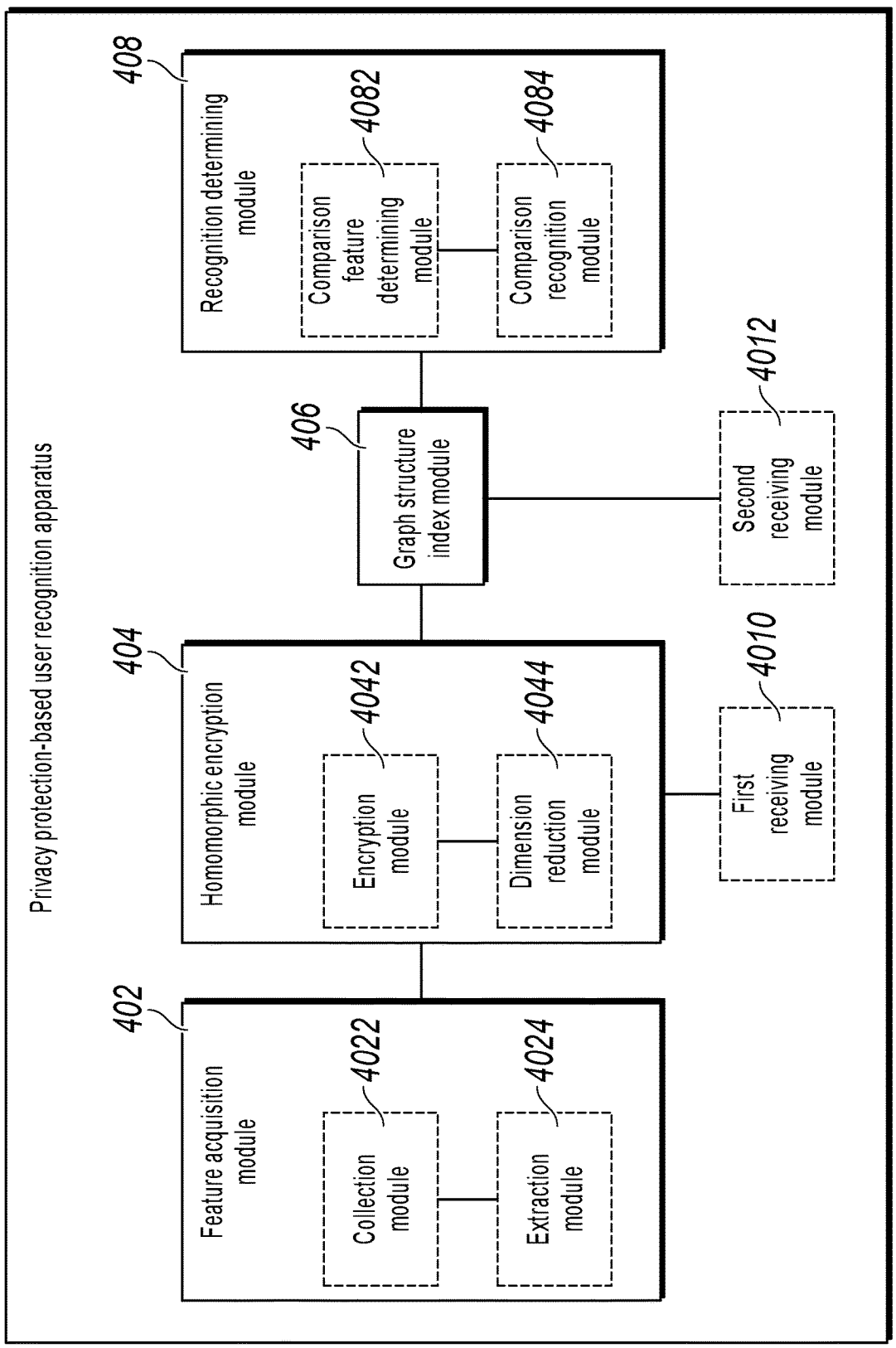
FIG. 4 is a schematic structural diagram illustrating a privacy protection-based user recognition apparatus, according to one or more embodiments of the present specification.
Figure 5:
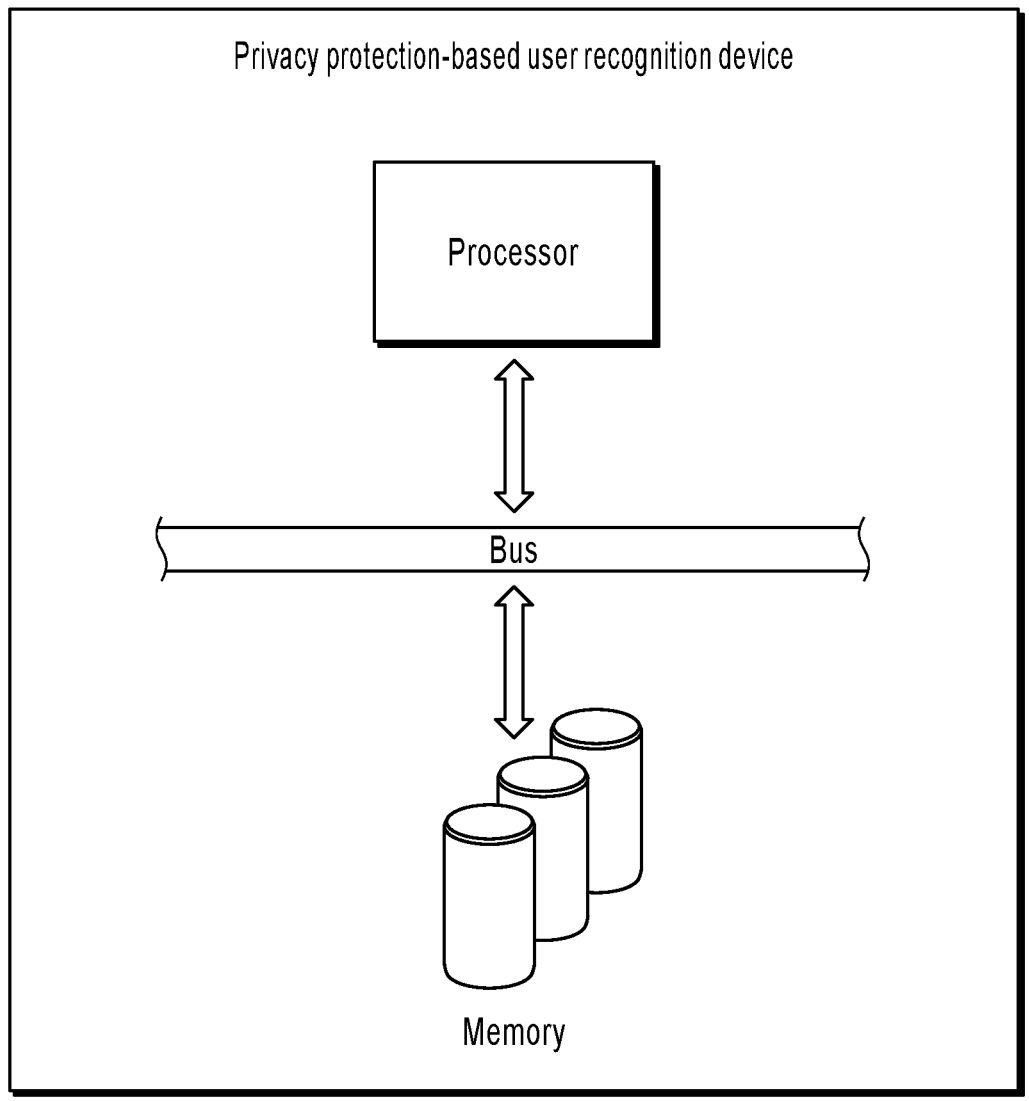
FIG. 5 is a schematic structural diagram illustrating a privacy protection-based user recognition device, according to one or more embodiments of the present specification.

Based on the same idea, the one or more embodiments of the present specification further provide an apparatus and a device corresponding to the previously described method, as shown in FIG. 4 and FIG. 5.

FIG. 4 is a schematic structural diagram illustrating a privacy protection-based user recognition apparatus, according to one or more embodiments of the present specification. Dashed-line blocks in the figure represent optional modules, and the apparatus includes:

a feature acquisition module 402, configured to obtain a biometric feature of a first user;

a homomorphic encryption module 404, configured to perform homomorphic encryption on the biometric feature of the first user to obtain a first ciphertext feature;

a graph structure index module 406, configured to determine a candidate ciphertext feature from a predetermined ciphertext feature set based on the first ciphertext feature and a predetermined graph structure index, where the ciphertext feature set includes second ciphertext features obtained by performing homomorphic encryption on biometric features of multiple second users, and the graph structure index is generated based on similarity among ciphertext features obtained through homomorphic encryption; and a recognition determining module 408, configured to determine a recognition result for the first user based on the candidate ciphertext feature.

Optionally, the biometric feature includes a facial feature.

The feature acquisition module 402 includes a collection module 4022 and an extraction module 4024.

The collection module 4022 is configured to perform a data collection operation on the face of the first user by using an optical component of a user mobile terminal device or a public terminal device.

The extraction module 4024 is configured to extract the facial features of the first user based on the data collection operation.

Optionally, the first ciphertext feature includes a first ciphertext high-dimensional feature and a first ciphertext low-dimensional feature.

The homomorphic encryption module 404 includes an encryption module 4042 and a dimension reduction module 4044.

The encryption module 4042 is configured to perform homomorphic encryption on the biometric feature of the first user to obtain the first ciphertext high-dimensional feature.

The dimension reduction module 4044 is configured to perform dimension reduction processing on the biometric feature of the first user and then the encryption module is configured to perform homomorphic encryption to obtain the first ciphertext low-dimensional feature.

Optionally, the ciphertext feature set includes a ciphertext high-dimensional feature subset and a ciphertext low-dimensional feature subset correspondingly generated based on dimension reduction processing, and the graph structure index is generated based on the ciphertext low-dimensional feature subset.

The graph structure index module 406 is configured to determine the candidate ciphertext feature from the predetermined ciphertext low-dimensional feature subset based on the first ciphertext low-dimensional feature and the predetermined graph structure index.

Optionally, the recognition determining module 408 includes a comparison feature determining module 4082 and a comparison recognition module 4084.

The comparison feature determining module 4082 is configured to determine ciphertext features corresponding to the candidate ciphertext feature from the ciphertext high-dimensional feature subset as comparison features.

The comparison recognition module 4084 is configured to compare the first ciphertext high-dimensional feature with the comparison features to determine the recognition result for the first user.

Optionally, the comparison recognition module 4084 is configured to compare the first ciphertext high-dimensional feature with the comparison features to determine whether there is a comparison feature that successfully matches the first ciphertext high-dimensional feature; and if yes, determine that the first user is a second user corresponding to the successfully matched comparison feature as the recognition result for the first user.

Optionally, the graph structure index includes graph nodes representing at least some ciphertext features in the ciphertext feature set and an edge generated between the graph nodes for index query.

The graph structure index module 406 is configured to determine one or more ciphertext features close to the first ciphertext feature from the graph structure index through index query as the candidate ciphertext feature.

Optionally, the graph structure index is generated based on the HNSW algorithm.

Optionally, the apparatus further includes a first receiving module 4010.

The first receiving module 4010 is configured to pre-receive an encryption key sent by a cloud side and used when the second ciphertext feature is obtained through homomorphic encryption before the homomorphic encryption module 404 performs homomorphic encryption on the biometric feature of the first user.

The homomorphic encryption module 404 is configured to perform homomorphic encryption on the biometric feature of the first user by using the encryption key.

Optionally, the apparatus is applied to the following devices in an offline environment or a weak network environment: a user mobile terminal device and/or a public terminal device.

Optionally, the apparatus further includes a second receiving module 4012, configured to pre-receive the ciphertext feature set sent by the cloud side before the graph structure index module 406 determines the candidate ciphertext feature from the predetermined ciphertext feature set based on the first ciphertext feature and the predetermined graph structure index.

The privacy includes the biometric features of the multiple second users, and the privacy is protected by the cloud side by performing homomorphic encryption on the biometric features of the multiple second users to obtain the ciphertext feature set.

FIG. 5 is a schematic structural diagram illustrating a privacy protection-based user recognition device, according to one or more embodiments of the present specification. The device includes: at least one processor; and a memory communicably coupled to the at least one processor.

The memory stores instructions that can be executed by the at least one processor, and the instructions are executed by the at least one processor to enable the at least one processor to: obtain a biometric feature of a first user; perform homomorphic encryption on the biometric feature of the first user to obtain a first ciphertext feature; determine a candidate ciphertext feature from a predetermined ciphertext feature set based on the first ciphertext feature and a predetermined graph structure index, where the ciphertext feature set includes second ciphertext features obtained by performing homomorphic encryption on biometric features of multiple second users, and the graph structure index is generated based on similarity among ciphertext features obtained through homomorphic encryption; and determine a recognition result for the first user based on the candidate ciphertext feature.

The processor can communicate with the memory by using a bus, and the device can further include an input/output interface for communicating with other devices.

Based on the same idea, the one or more embodiments of the present specification further provides a non-volatile computer storage medium corresponding to the previously described method, storing computer-executable instructions. The computer-executable instructions are set to: obtain a biometric feature of a first user; perform homomorphic encryption on the biometric feature of the first user to obtain a first ciphertext feature; determine a candidate ciphertext feature from a predetermined ciphertext feature set based on the first ciphertext feature and a predetermined graph structure index, where the ciphertext feature set includes second ciphertext features obtained by performing homomorphic encryption on biometric features of multiple second users, and the graph structure index is generated based on similarity among ciphertext features obtained through homomorphic encryption; and determine a recognition result for the first user based on the candidate ciphertext feature.

In the 1990$s$, whether a technical improvement is a hardware improvement (for example, an improvement of circuit structures, such as a diode, a transistor, or a switch) or a software improvement (an improvement of a method process) can be clearly distinguished. However, as technologies develop, current improvements of many method processes can be considered as direct improvements on hardware circuit structures. Almost all designers program an improved method process into a hardware circuit, to obtain a corresponding hardware circuit structure. Therefore, a method process can be implemented by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without needing a chip manufacturer to design and manufacture a dedicated integrated circuit chip. In addition, at present, instead of manually manufacturing an integrated circuit chip, this type of programming is mostly implemented by using "logic compiler" software. The "logic compiler" software is similar to a software compiler used to develop and write a program. Original code needs to be written in a particular programming language before compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method process can be readily obtained provided that the method process is logically programmed by using several of the previously described HDLs and is programmed into an integrated circuit.

A controller can be implemented by using any appropriate method. For example, the controller can be in a form a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of the memory. A person skilled in the art should also know that, in addition to implementing the controller by using only the computer readable program code, method steps can be logically programmed to allow the controller to implement the same function in a form of the logic gate, the switch, the ASIC, the programmable logic controller, or the built-in microcontroller. Therefore, the controller can be considered as a hardware component, and an apparatus included in the controller and configured to implement various functions can also be considered as a structure in the hardware component. Alternatively, the apparatus configured to implement various functions can even be considered as both a software module for implementing the method and a structure in the hardware component.

The system, apparatus, module, or unit illustrated in the previously described embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into various units based on functions for separate description. Certainly, when the present specification is implemented, functions of the units can be implemented in one or more pieces of software and/or hardware.

A person skilled in the art should understand that the embodiments of the present specification can be provided as methods, systems, or computer program products. Therefore, the embodiments of the present specification can be in a form of hardware only embodiments, software only embodiments, or embodiments with a combination of software and hardware. Moreover, the embodiments of the present specification can be in a form of a computer program product implemented on one or more computer-usable storage media (including but not limited to a magnetic disk memory, a CD-ROM, an optical memory, etc.) that include computer-usable program code.

The present specification is described with reference to the flowcharts and/or block diagrams of the method, the device (system), and the computer program product according to the embodiments of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

Alternatively, these computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

Alternatively, these computer program instructions can be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory can include a non-persistent memory, a random access memory (RAM), a non-volatile memory, and/or another form in a computer readable medium, for example, a read-only memory (ROM) or a flash memory (flash RAM). The memory is an example of the computer readable medium.

The computer-readable medium includes persistent, non-persistent, movable, and unmovable media that can store information by using any method or technology. The information can be a computer readable instruction, a data structure, a program module, or other data. Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, or a magnetic tape/magnetic disk storage or another magnetic storage device. The computer storage medium can be configured to store information accessible to a computing device. Based on the definition in the present specification, the computer readable medium does not include computer readable transitory media (transitory media) such as a modulated data signal and carrier.

It is worthwhile to further note that, the terms "include," "comprise," or their any other variants are intended to cover a non-exclusive inclusion, so that a process, a method, a product, or a device that includes a list of elements not only includes those elements but also includes other elements not expressly listed, or further includes elements inherent to such process, method, product, or device. Without more constraints, an element preceded by "includes a . . . " does not preclude the existence of additional identical elements in the process, method, product, or device that includes the element.

The present specification can be described in the general context of computer-executable instructions executed by a computer, for example, a program module. Generally, the program module includes a routine, a program, an object, a component, a data structure, etc. for executing a specific task or implementing a specific abstract data type. The present specification can alternatively be practiced in distributed computing environments. In these distributed computing environments, tasks are performed by remote processing devices connected through a communications network. In the distributed computing environments, the program module can be located in both local and remote computer storage media including storage devices.

The embodiments of the present specification are described in a progressive way. For same or similar parts of the embodiments, mutual references can be made to the embodiments. Each embodiment focuses on a difference from other embodiments. Especially, the apparatus, device, and non-volatile computer storage medium embodiments are basically similar to the method embodiment, and therefore are described briefly. For a related part, references can be made to some descriptions in the method embodiment.

Specific embodiments of the present specification are described above. Other embodiments fall within the scope of the appended claims. In some cases, the actions or steps described in the claims can be performed in an order different from the order in the embodiments and the desired results can still be achieved. In addition, the process depicted in the accompanying drawings does not necessarily need the shown particular execution order or sequence to achieve the desired results. In some implementations, multi-tasking processing and parallel processing are allowed or may be advantageous.

The previous descriptions are merely one or more embodiments of the present specification, and are not intended to limit the present specification. For a person skilled in the art, various modifications and changes can be made to the one or more embodiments of the present specification. Any modification, equivalent replacement, improvement, etc. made within the spirit and the principle of the one or more embodiments of the present specification shall fall within the scope of the claims of the present specification.

What is claimed is:

1. A computer-implemented method for privacy-protected user recognition, comprising:
    collecting data using a terminal device and extracting a facial feature of a first user based on the collected data;
    obtaining a first ciphertext feature comprising:
        performing a homomorphic encryption on the facial feature to obtain a first high-dimensional feature; and
        performing dimension reduction on the facial feature and performing the homomorphic encryption to obtain a first low-dimensional feature;
    determining a candidate ciphertext feature from a predetermined ciphertext feature set based on the first ciphertext feature and a predetermined graph structure index, wherein the predetermined ciphertext feature set comprises a plurality of second ciphertext features obtained by performing the homomorphic encryption of a plurality of biometric features of multiple second users, and wherein the predetermined graph structure index is generated based on similarity among at least some of the plurality of second ciphertext features in the predetermined ciphertext feature set; and
    determining a recognition result for the first user based on the candidate ciphertext feature, wherein the predetermined ciphertext feature set comprises a high-dimensional feature subset generated by performing the homomorphic encryption on the at least some of the plurality of biometric features of the multiple second users, and wherein determining a recognition result for the first user based on the candidate ciphertext feature comprises:
        determining, from the high-dimensional feature subset, ciphertext features corresponding to the candidate ciphertext feature as comparison features; and
        determining the recognition result for the first user by comparing the first high-dimensional feature with the comparison features.

2. The computer-implemented method according to claim 1, wherein the predetermined ciphertext feature set comprises:
    a low-dimensional feature subset generated by performing dimension reduction on the at least some of the plurality of biometric features of the multiple second users to get second low-dimensional features and performing the homomorphic encryption on the second low-dimensional features,
    wherein the predetermined graph structure index is generated based on the low-dimensional feature subset, and
    wherein determining a candidate ciphertext feature from the predetermined ciphertext feature set based on the first ciphertext feature and the predetermined graph structure index comprises determining the candidate ciphertext feature from the low-dimensional feature subset based on the first low-dimensional feature and the predetermined graph structure index.

3. The computer-implemented method according to claim 1, wherein determining the recognition result for the first user by comparing the first high-dimensional feature with the comparison features comprises:
    determining whether a comparison feature matches the first high-dimensional feature by comparing the first high-dimensional feature with the comparison features; and
    in response to determining that the comparison feature matches the first high-dimensional feature, determining, as the recognition result for the first user, that the first user is one of the multiple second users that corresponds to the comparison feature.

4. The computer-implemented method according to claim 1, wherein the predetermined graph structure index comprises one or more graph nodes representing at least some of the plurality of second ciphertext features in the predetermined ciphertext feature set and one or more edges generated between the one or more graph nodes; and
    wherein determining the candidate ciphertext feature from the predetermined ciphertext feature set based on the first ciphertext feature and the predetermined graph structure index comprises determining, from the predetermined graph structure index and through index query, one or more ciphertext features close to the first ciphertext feature as the candidate ciphertext feature.

5. The computer-implemented method according to claim 4, wherein the predetermined graph structure index is generated based on a hierarchical navigable small world (HNSW) algorithm.

6. The computer-implemented method according to claim 1, wherein the method further comprises, before performing the homomorphic encryption on the facial feature of the first user, pre-receiving an encryption key used to obtain the first ciphertext feature through the homomorphic encryption, and
wherein performing the homomorphic encryption on the facial feature of the first user comprises performing the homomorphic encryption on the facial feature of the first user by using the encryption key.

7. The computer-implemented method according to claim 1, wherein the terminal device is offline or has poor network connectivity.

8. The computer-implemented method according to claim 1, wherein the method further comprises, before determining the candidate ciphertext feature from the predetermined ciphertext feature set based on the first ciphertext feature and the predetermined graph structure index:
pre-receiving the predetermined ciphertext feature set sent by a cloud-side device, wherein privacy comprises the plurality of biometric features of the multiple second users, and privacy protection is achieved by performing the homomorphic encryption on the plurality of biometric features of the multiple second users to obtain the predetermined ciphertext feature set.

9. A computer-implemented system, comprising:
one or more computers; and
one or more computer memory devices interoperably coupled with the one or more computers and having tangible, non-transitory, machine-readable media storing one or more instructions that, when executed by the one or more computers, perform operations for privacy-protected user recognition:
collecting data using a terminal device and extracting a facial feature of a first user based on the collected data;
obtaining a first ciphertext feature, comprising:
performing a homomorphic encryption on the facial feature to obtain a first high-dimensional feature; and
performing dimension reduction on the facial feature and performing the homomorphic encryption to obtain a first low-dimensional feature;
determining a candidate ciphertext feature from a predetermined ciphertext feature set based on the first ciphertext feature and a predetermined graph structure index, wherein the predetermined ciphertext feature set comprises a plurality of second ciphertext features obtained by performing the homomorphic encryption of a plurality of biometric features of multiple second users, and wherein the predetermined graph structure index is generated based on similarity among at least some of the plurality of second ciphertext features in the predetermined ciphertext feature set; and
determining a recognition result for the first user based on the candidate ciphertext feature, wherein the predetermined ciphertext feature set comprises a high-dimensional feature subset generated by performing the homomorphic encryption on the at least some of the plurality of biometric features of the multiple second users, and wherein determining a recognition result for the first user based on the candidate ciphertext feature comprises:
determining, from the high-dimensional feature subset, ciphertext features corresponding to the candidate ciphertext feature as comparison features; and
determining the recognition result for the first user by comparing the first high-dimensional feature with the comparison features.

10. The computer-implemented system according to claim 9, wherein the predetermined ciphertext feature set comprises:
a low-dimensional feature subset generated by performing dimension reduction on the at least some of the plurality of biometric features of the multiple second users to get second low-dimensional features and performing the homomorphic encryption on the second low-dimensional features,
wherein the predetermined graph structure index is generated based on the low-dimensional feature subset, and
wherein determining a candidate ciphertext feature from the predetermined ciphertext feature set based on the first ciphertext feature and the predetermined graph structure index comprises determining the candidate ciphertext feature from the low-dimensional feature subset based on the first low-dimensional feature and the predetermined graph structure index.

11. The computer-implemented system according to claim 9, wherein determining the recognition result for the first user by comparing the first high-dimensional feature with the comparison features comprises:
determining whether a comparison feature matches the first high-dimensional feature by comparing the first high-dimensional feature with the comparison features; and
in response to determining that the comparison feature matches the first high-dimensional feature, determining, as the recognition result for the first user, that the first user is one of the multiple second users that corresponds to the comparison feature.

12. The computer-implemented system according to claim 9, wherein the predetermined graph structure index comprises one or more graph nodes representing at least some of the plurality of second ciphertext features in the predetermined ciphertext feature set and one or more edges generated between the one or more graph nodes; and
wherein determining the candidate ciphertext feature from the predetermined ciphertext feature set based on the first ciphertext feature and the predetermined graph structure index comprises determining, from the predetermined graph structure index and through index query, one or more ciphertext features close to the first ciphertext feature as the candidate ciphertext feature.

13. The computer-implemented system according to claim 12, wherein the predetermined graph structure index is generated based on a hierarchical navigable small world (HNSW) algorithm.

14. A non-transitory, computer-readable medium storing one or more instructions executable by a computer system to perform operations comprising:
collecting data using a terminal device and extracting a facial feature of a first user based on the collected data;
obtaining a first ciphertext feature, comprising:
performing a homomorphic encryption on the facial feature to obtain a first high-dimensional feature; and
performing dimension reduction on the facial feature and performing the homomorphic encryption to obtain a first low-dimensional feature;

determining a candidate ciphertext feature from a predetermined ciphertext feature set based on the first ciphertext feature and a predetermined graph structure index, wherein the predetermined ciphertext feature set comprises a plurality of second ciphertext features obtained by performing the homomorphic encryption of a plurality of biometric features of multiple second users, and wherein the predetermined graph structure index is generated based on similarity among at least some of the plurality of second ciphertext features in the predetermined ciphertext feature set; and determining a recognition result for the first user based on the candidate ciphertext feature, wherein the predetermined ciphertext feature set comprises a high-dimensional feature subset generated by performing the homomorphic encryption on the at least some of the plurality of biometric features of the multiple second users, and wherein determining a recognition result for the first user based on the candidate ciphertext feature comprises:

determining, from the high-dimensional feature subset, ciphertext features corresponding to the candidate ciphertext feature as comparison features; and determining the recognition result for the first user by comparing the first high-dimensional feature with the comparison features.

\* \* \* \* \*